No. 843,350.
PATENTED FEB. 5, 1907.
C. S. MORSE.
HASP FASTENER.
APPLICATION FILED DEC. 10, 1906.
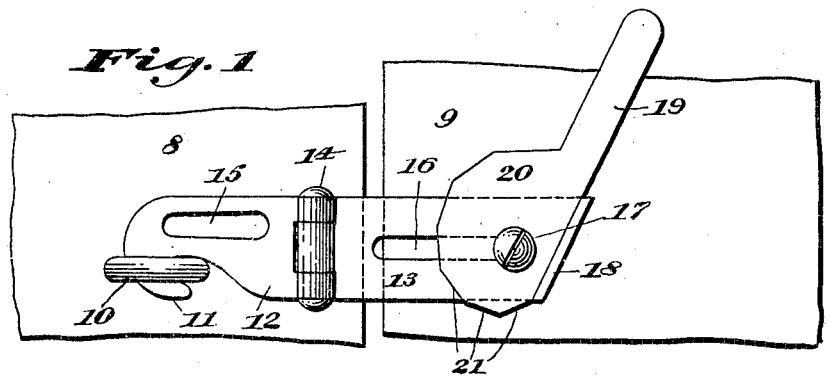
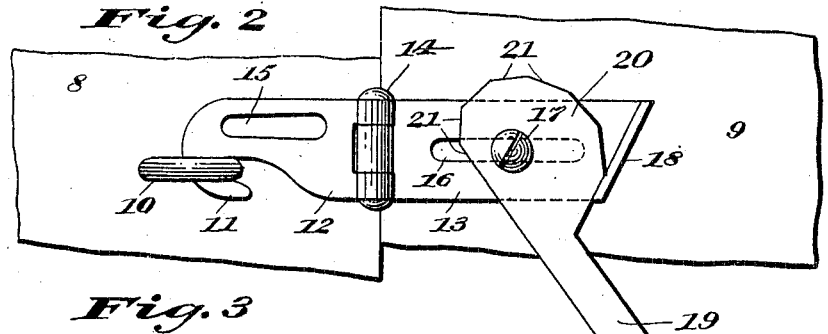
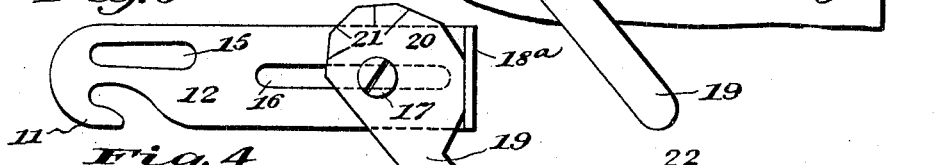
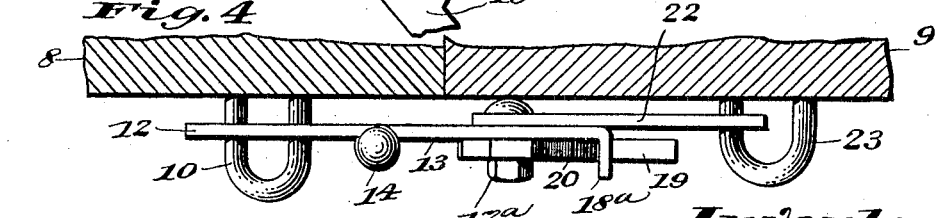
Witnesses
Inventor
Clyde S. Morse
By Chas. A. Tillman
Attorney.

UNITED STATES PATENT OFFICE.

CLYDE S. MORSE, OF SHABBONA, ILLINOIS.

HASP-FASTENER.

No. 843,350.  Specification of Letters Patent.  Patented Feb. 5, 1907.

Application filed December 10, 1906. Serial No. 347,005.

*To all whom it may concern:*

Be it known that I, CLYDE S. MORSE, a citizen of the United States, residing at Shabbona, in the county of Dekalb and State of Illinois, have invented certain new and useful Improvements in Hasp-Fasteners, of which the following is a specification.

This invention relates to improvements in that class of fastening devices in which a hasp is connected at one of its ends to one of the parts to be secured together and adapted to engage a staple or other engaging device on the other part to be secured, and it is applicable for use in securing wagon end-gates in place between the sides of the wagon-body, for barn-doors, car-doors, sliding doors of various kinds, gates, and the like; and it consists in certain peculiarities of the construction, novel arrangement, and operation of the various parts thereof, as will be hereinafter more fully set forth and specifically claimed.

The objects of the invention are to provide a fastener which may be used for connecting and securing together two parts or pieces of almost any kind of a structure in such a manner that they may be drawn thereby one toward the other and firmly held in such a position, thus preventing rattling and the danger of becoming or being disconnected or unfastened, and which shall be simple and inexpensive in construction, strong, durable, and effective in operation, yet so made that its parts may be readily locked in position or easily unlocked.

Other objects and advantages of the invention will be disclosed in the subjoined description and explanation.

In order to enable others skilled in the art to which my invention pertains to make and use the same, I will now proceed to describe it, referring to the accompanying drawings, in which—

Figure 1 is a view in side elevation of a fastener embodying one form of the invention, showing it in position on the pieces or parts to be connected together and illustrating said pieces slightly separated and the parts of the fastener in their initial positions for fastening the pieces and for drawing them together. Fig. 2 is a similar view of like parts, showing the pieces drawn together and the position of the locking-lever when the greatest strain thereof is exerted on the hasp. Fig. 3 is a view similar to that shown in Fig. 2, but illustrating a modification in the construction of the fastener and showing the locking-lever in a different position from that illustrated in Fig. 2. Fig. 4 is a plan sectional view of the construction shown in Fig. 3; and Fig. 5 is a fragmental face view of a modification in the fastener, showing it detached from the pieces to be secured together.

Like numerals of reference refer to corresponding parts throughout the different views of the drawings.

The two pieces to be connected and secured together are designated by the reference-numerals 8 and 9 and in the present instance may be assumed as being portions of two sliding doors or a movable part and a fixed part; but it will be understood that they may represent other pieces which it is desired to connect and secure together. One of these pieces has secured thereon an engaging device, which in the present instance is shown as being a staple 10, but which may be a headed bolt, if desired, for engagement with the hook 11 on the free end of the hasp, which is preferably made of two pieces 12 and 13, which are connected together by means of a hinge 14, so that they may be turned at any desired angle with respect to one another or in such a manner that the elongated opening 15, with which the member 12 is provided, may be passed over the staple 10, so that the same may be inserted therein, as is clearly shown in Fig. 3 of the drawings. As shown, the member 13 of the hasp is provided with a longitudinal slot 16, through which a bolt 17 is passed into the piece or portion 9, thus pivotally and movably securing the hasp to said piece or portion, thereby allowing it to be raised at its free end, so as to disengage the hook from the staple 10 or engaging device, when they are in engagement, as shown in Fig. 1 of the drawings. That end of the hasp opposite to that on which the hook 11 is formed is provided with an outturned flange 18, which may be inclined, as shown in Figs. 1 and 2 of the drawings. Pivotally and eccentrically mounted on the bolt 17, which, as before stated, pivotally holds the hasp on the portion 9, is a locking-lever 19, which has a cam-head 20, provided with a series of facets 21 on its edge, which are adapted to engage the flange 18 on the hasp, so as to cause it to move from the staple 10 or engaging device on the portion 8 and to hold it firmly in such position. As shown in the different views of the drawings, the facets 21 are progressively formed or located with respect to the fulcrum 17 of the lever 19—that is to say, the facet adjacent to the flange 18, as shown in Fig. 1, is located nearer the pivot or bolt 17 than the next one thereto, and so on throughout the series. By this construction it is apparent that by turning the lever 19 from the position shown in Fig. 1 toward the staple 10 or engaging device the facets on the head thereof will be successively brought in contact with the flange 18 on the hasp, thereby forcing it in a direction opposite from the staple 10 or engaging device, thus causing the portions 8 and 9 to be drawn together and firmly held in place.

Instead of forming the member 13 of the hasp with an inclined flange 18, as shown in Figs. 1 and 2 of the drawings, I may provide it with a flange 18$^a$, located at a right angle thereto, as shown in Figs. 3 and 4, when about the same result will be attained, except that by inclining the flange the lever 19 may be held thereby in the position shown in Fig. 1, when the parts are in loose connection with one another.

In the construction shown in Figs. 3 and 4 another modified construction besides that of the arrangement of the flange is employed, which consists in securing the hasp to one end of a plate or link 22, by means of a bolt 17$^a$, which is passed through the slot 16 in the hasp and through a suitable opening in the head of the locking-lever. The other end of the link or plate 22 is secured to a staple 23 or other securing device in such a manner that the plate or link 22, which carries the hasp and locking-lever, may be turned to any desired angle with respect to the portion 19, so that the hooked or slotted end of the hasp may engage an engaging device on the other part to be connected or fastened, whether it is in alinement with the part 9 or not.

While I have shown in Figs. 1 to 4, inclusive, the hasp formed of two pieces 12 and 13 and secured together by means of a hinge 14 for the purpose above set forth, yet it is evident that I may make it of a single piece and dispense with the hinge, as shown in Fig. 5, yet in so doing it is obvious that a staple could not well be passed through the opening 15 unless the construction shown in Figs. 3 and 4 should be employed, for the reason the bolt 17 would hold the hasp close against the portion 9, to which it is pivoted.

From the foregoing and by reference to the drawings it will be understood and clearly seen that by employing a device constructed according to my invention a very strong, durable, and effective fastener will be afforded, by means of which two pieces or parts may be quickly and firmly secured together and drawn one toward the other, yet may be easily disengaged or released.

It is apparent that when the staple 10 shall have been passed through the slot 15 of the hasp, as shown in Figs. 3 and 4 of the drawings, a padlock may be used in connection with the staple to lock the hasp in position thereon.

Having thus fully described my invention, what I claim as new, and desire to secure by Letters Patent, is—

1. In a fastener, the combination with a hasp pivotally and movably secured near one of its ends and provided at its secured end with a projecting flange, the other end of the hasp having means to engage an engaging device, of a locking-lever pivotally and eccentrically mounted on the pivot of the hasp and having a cam-head provided with a series of facets on its edge to engage the flange of the hasp.

2. In a fastener, the combination with a hasp provided at one of its ends with a laterally-projecting flange and at its other end with means to engage an engaging device on one of the parts to be secured and having near said flange a longitudinally-extending slot, of a pivot extended through said slot, a locking-lever pivotally and eccentrically mounted on the said pivot and having a cam-head provided with a series of facets on its edge to engage the flange of the hasp, the said facets being located at varying distances and angles to the said pivot.

3. In a fastener, the combination with a hasp consisting of two pieces hinged together, one of said pieces having near its free end means to engage an engaging device and the other of said pieces having at one of its ends a laterally-projecting flange and provided with a longitudinally-extending slot, of a pivot extended through said slot, a locking-lever pivotally and eccentrically mounted on said pivot and having a cam-head provided with a series of facets on its edge to engage the flange of the hasp.

4. In a fastener, the combination with a hasp pivotally and movably secured near one of its ends to one of the parts to be secured together, the said hasp consisting of two members hinged together, one of said members having near its free end means to engage an engaging device secured on the other part to be fastened and the other of said members having at one of its ends a laterally-projecting flange, of a locking-lever pivotally and eccentrically mounted on the pivot of the hasp and having a cam-head provided with a series of facets on its edge to engage the flange of the hasp.

5. In a fastener, the combination with a hasp having at one of its ends means for engaging an engaging device and at its other end a laterally-projecting flange and provided near said flange with a longitudinally-extending slot, of a plate loosely secured at one of its ends to one of the parts to be connected together and pivotally and movably secured at its other end to the hasp, a locking-lever pivotally and eccentrically mounted on the hasp and having a cam-head provided with a series of facets on its edge to engage the flange of the hasp.

6. In a fastener, the combination with a hasp consisting of two members hinged together, one of said members having near its free end means to engage an engaging device secured on one of the pieces to be connected together and the other of said members having at one of its ends a laterally-projecting flange and provided near said flange with a longitudinally-extending slot, of a pivot extended through the slot of the hasp, a plate pivotally secured at one of its ends on said pivot and loosely secured at its other end to one of the pieces to be connected together, a locking-lever eccentrically mounted on said pivot and having a cam-head provided with a series of facets on its edge to engage the flange of the hasp.

CLYDE S. MORSE.

Witnesses:
   CHAS. F. STEIN,
   DAVID JONES.